(12) United States Patent
Chung

(10) Patent No.: US 6,733,016 B2
(45) Date of Patent: May 11, 2004

(54) COMBINATION GOLF CLUB CLEANER AND BAG HOLDER

(76) Inventor: Hyoung Koo Chung, 407 Valley Ave. NE., Apt. K-104, Puyallup, WA (US) 98372

( * ) Notice: Subject to any disclaimer, the term of this patent is extended or adjusted under 35 U.S.C. 154(b) by 0 days.

(21) Appl. No.: 10/189,693

(22) Filed: Jul. 3, 2002

(65) Prior Publication Data

US 2003/0098561 A1 May 29, 2003

Related U.S. Application Data

(60) Provisional application No. 60/333,939, filed on Nov. 27, 2001.

(51) Int. Cl.⁷ .................................................. B62B 1/00
(52) U.S. Cl. ............................... 280/47.24; 280/DIG. 6
(58) Field of Search ................................. 280/651, 652, 280/DIG. 6, 654, 655, 47.27, 47.315, 645, 646, 164.2, 47.26, 47.17, 47.24; D34/15; D32/35; 15/160, 161, 105, 104.92; 206/315.8, 315.3, 315.4, 315.5, 315.6, 315.7

(56) References Cited

U.S. PATENT DOCUMENTS

| | | | | |
|---|---|---|---|---|
| 2,810,586 A | * | 10/1957 | Troka | 280/40 |
| 3,028,617 A | * | 4/1962 | Racina | 15/160 |
| 3,142,853 A | * | 8/1964 | Hensley | 15/160 |
| 3,747,150 A | * | 7/1973 | Kozub | 15/105 |
| 4,289,326 A | * | 9/1981 | Hawkes | 280/646 |
| 4,821,358 A | | 4/1989 | Wyckoff et al. | 15/104.92 |
| 4,944,063 A | | 7/1990 | Jordan | 15/104.92 |
| 4,958,396 A | | 9/1990 | Butler et al. | 15/21.2 |
| 5,155,883 A | | 10/1992 | Legault | 15/21.1 |
| 5,479,674 A | * | 1/1996 | Gilcrest | 15/161 |
| 5,555,589 A | * | 9/1996 | Moultrie | 15/105 |
| D386,847 S | * | 11/1997 | Petrie | D32/35 |
| 5,752,634 A | * | 5/1998 | Kortman | 224/274 |
| 5,878,460 A | * | 3/1999 | Bruce | 15/160 |
| 5,940,918 A | | 8/1999 | Binette | 15/21.1 |
| 5,970,561 A | * | 10/1999 | Archibeque | 15/161 |
| D428,224 S | * | 7/2000 | Alexander | D32/35 |
| 6,152,463 A | * | 11/2000 | Wu | 280/47.17 |
| 2003/0084532 A1 | * | 5/2003 | Doan | 15/160 |
| 2003/0233720 A1 | * | 12/2003 | Kunkle et al. | 15/161 |

FOREIGN PATENT DOCUMENTS

| | | | |
|---|---|---|---|
| CA | 2279016 | * | 1/2001 |
| JP | 8-780 | * | 1/1996 |

* cited by examiner

Primary Examiner—Bryan Fischmann
(74) Attorney, Agent, or Firm—Dean A. Craine

(57) ABSTRACT

A manual golf cart with combination golf club head cleaner and bag holder that allows users to support a golf bag on a manual cart and selectively clean a golf club. The holder includes a golf bag support member attached to the central post member. The support member includes an integrally formed upper support plate and a lower resting plate. The two plates are aligned rearward and are spaced apart on the post member to form a rear extending golf club opening. Attached to the top and bottom surfaces of the bag support plate and the lower cleaning plate, respectively, are two sets of bristles. The bristles have sufficient rigidity and length to clean the top and bottom surfaces of a golf club head inserted into the golf club opening. In the preferred embodiment, the bottom surface of the lower resting plate includes optional teeth that grip the soil during use to hold the golf cart in place when a golf club is being cleaned. The lower resting plate may also include a central basin in which a small volume of water may be placed to enhance cleaning.

12 Claims, 5 Drawing Sheets

COMBINATION GOLF CLUB CLEANER AND BAG HOLDER

This is a utility patent application based on the provisional patent application (Serial No. 60/333,939) filed on Nov. 27, 2001.

BACKGROUND OF THE INVENTION

1. Field of the Invention

This invention pertains to golf club cleaners, and more particularly, to cleaners for golf club heads that selectively attach to golf club carts or golf club bags.

2. Description of the Related Art

Golfers often use manual golf carts to transport their golf bags around a golf course. Typically, the manual golf carts comprise a pair of wheels attached to folding legs connected to a sleeve member that slides up and down over a central post member. Attached to the proximal end of the post member is a fixed or pivotable handle. Attached and perpendicularly aligned on the opposite distal end of the post member is a bag support plate designed to support and hold the lower end of a golf bag on the cart.

Usually the bag support plate is made of durable, lightweight material, such as plastic or aluminum, that extends rearward under the golf bag. Straps attached to the support plate wrap around the lower portion of the golf bag to hold it on the bag support plate.

It is widely known that dirt becomes imbedded in the grooves of golf club heads when playing golf and that the golf club heads require periodic cleaning. For this reason, golf courses and golf driving range operators often provide manual golf club cleaners at fixed locations at these facilities. Typical golf club cleaners are comprised of a large box, one or more sets of brushes located therein, and a small volume of water. The player inserts the golf club head into the box and moves a set of brushes across the golf club head to frictionally remove dirt particles from the grooves.

Fixed golf club cleaners located at individual holes on a golf course are not desirable because they create an obstruction. Also, because they contain water, they become another piece of equipment that must be frequently cleaned by golf course personnel.

What is needed is a golf club head cleaner that is attached to a manual golf cart.

SUMMARY OF THE INVENTION

It is an object of the present invention to provide a golf club head cleaner that is attached to a manual golf cart.

It is another object of the present invention to provide such a device that can be easily adapted to an existing manual golf cart that does not impede its operation.

These and other objects are met by a combination golf bag support and golf club head cleaner disclosed herein that is attached to the distal end of the central post member on a manual golf cart. The golf cart head cleaner component is integrally formed with a bag support plate so that a manual golf cart operates in the same manner as a standard, manual golf cart.

The bag support plate is perpendicularly aligned and extends rearward from the distal end of the post member. Attached to the bottom surface of the bag support plate is a set of downward extending bristles. Located below the bag support plate is a lower resting plate with a set of upward extending bristles. The resting plate is slightly longer than the bag support plate and is diagonally aligned with respect to the upper bag support plate so that when the resting plate is positioned on the ground, it acts as a support surface when the post member is diagonally aligned.

Formed on the bottom surface of the resting plate are optional ground gripping elements which engage the soil to hold the manual golf cart in position when a golf club is inserted into the cleaner component and moved back and forth for cleaning. The resting plate may also include an optional raised perimeter edge to form a central basin which may be partially filled with water to enhance cleaning. Attached to the body member is a pair of straps that wrap around a lower portion of a golf bag to securely hold the golf bag in place over the manual cart.

DESCRIPTION OF THE PREFERRED EMBODIMENT(S)

Figure 1:
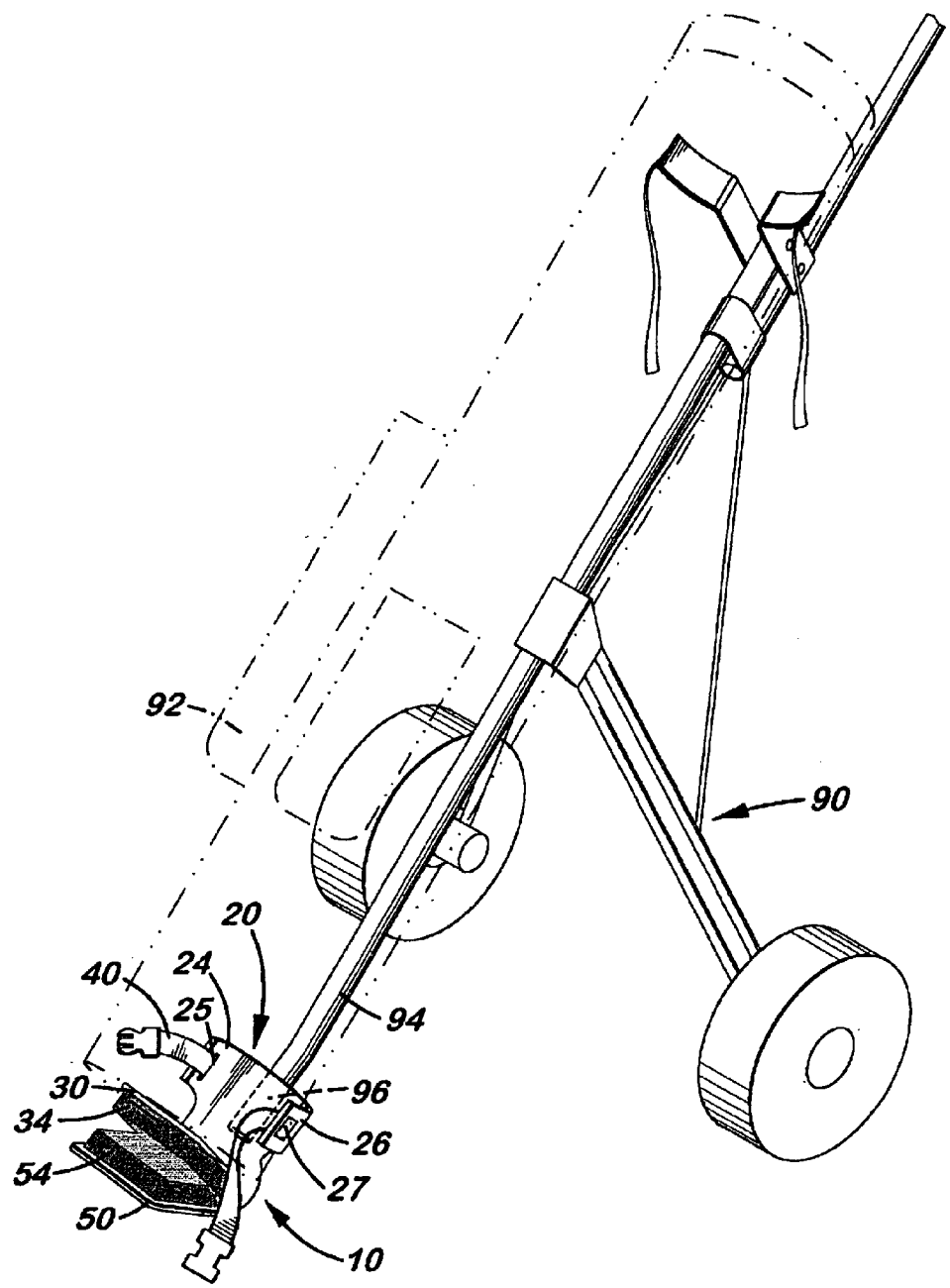
FIG. 1 is a perspective view of the combination golf club cleaner and bag holder disclosed herein.
Figure 2:
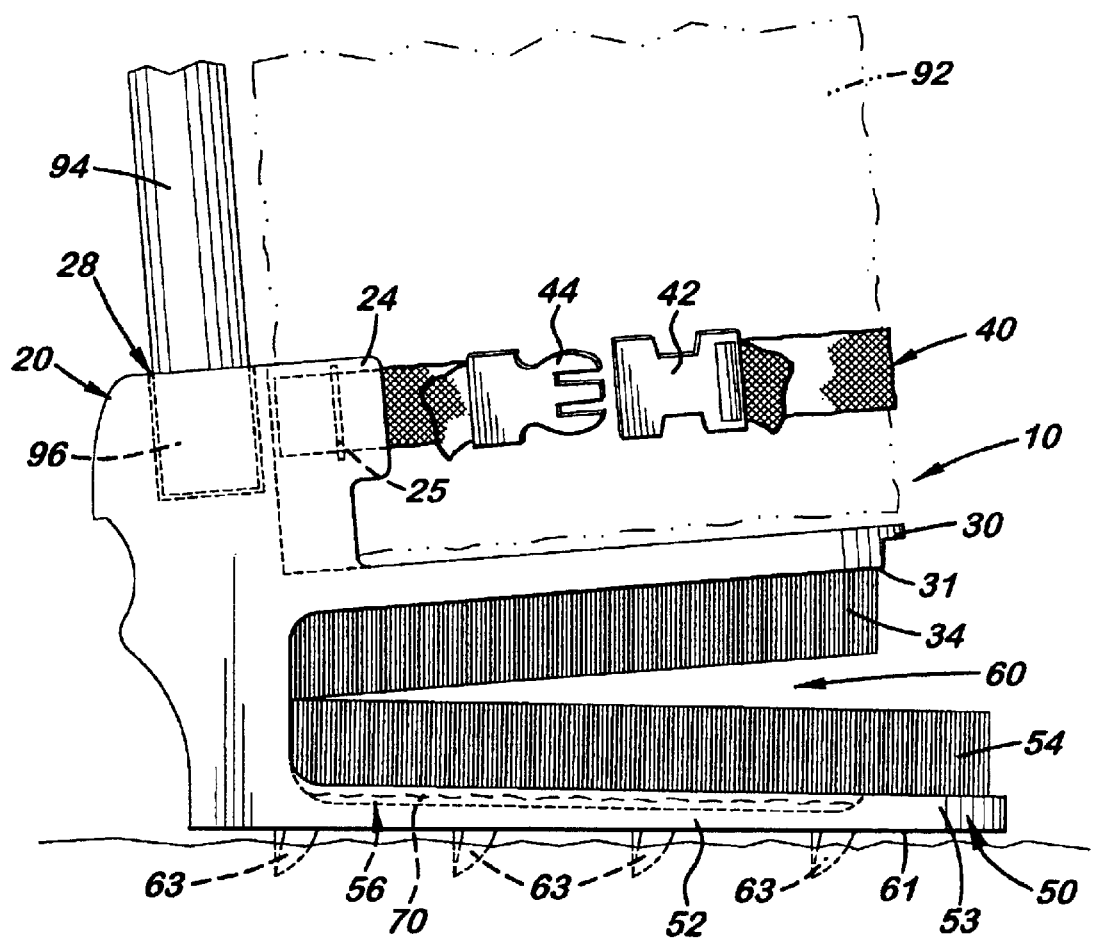
FIG. 2 is a left side elevation view of the invention.
Figure 3:
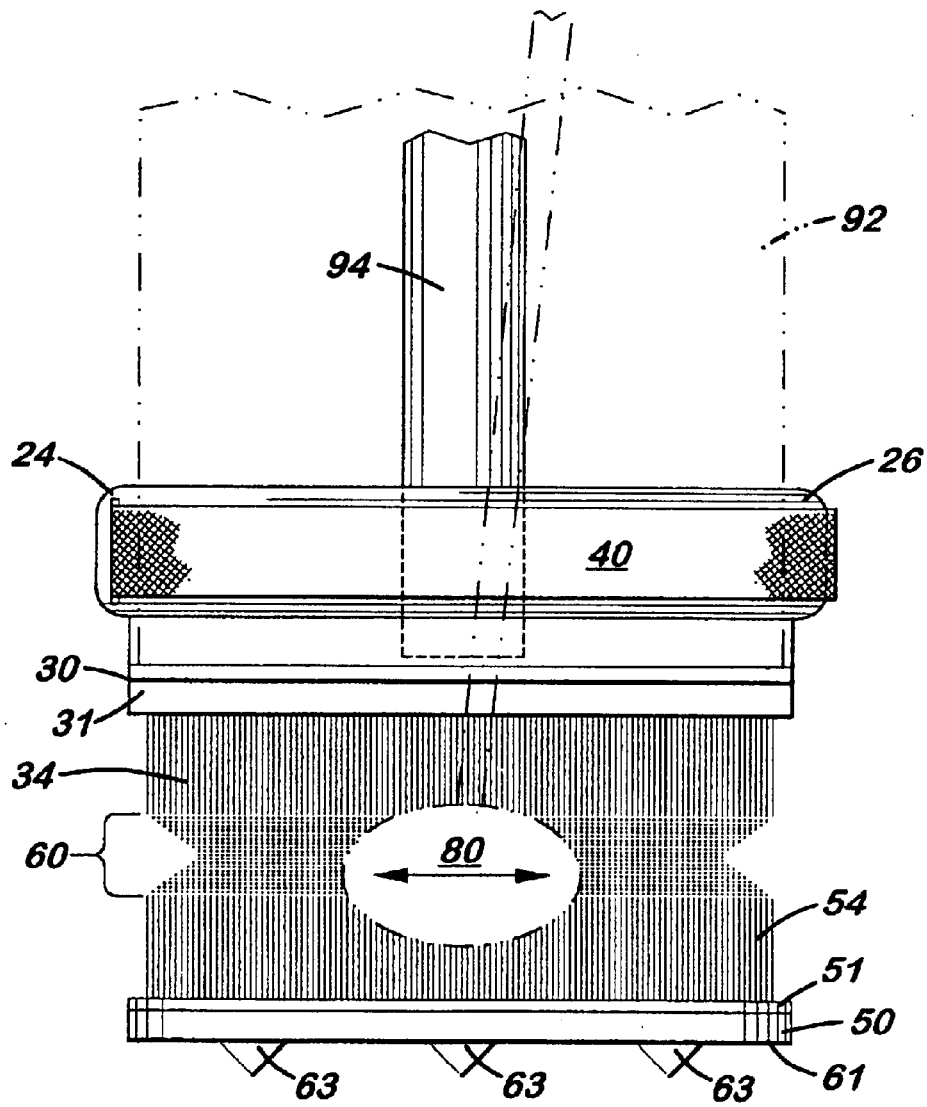
FIG. 3 is a front elevation view of the invention with a golf club disposed therein.
Figure 4:
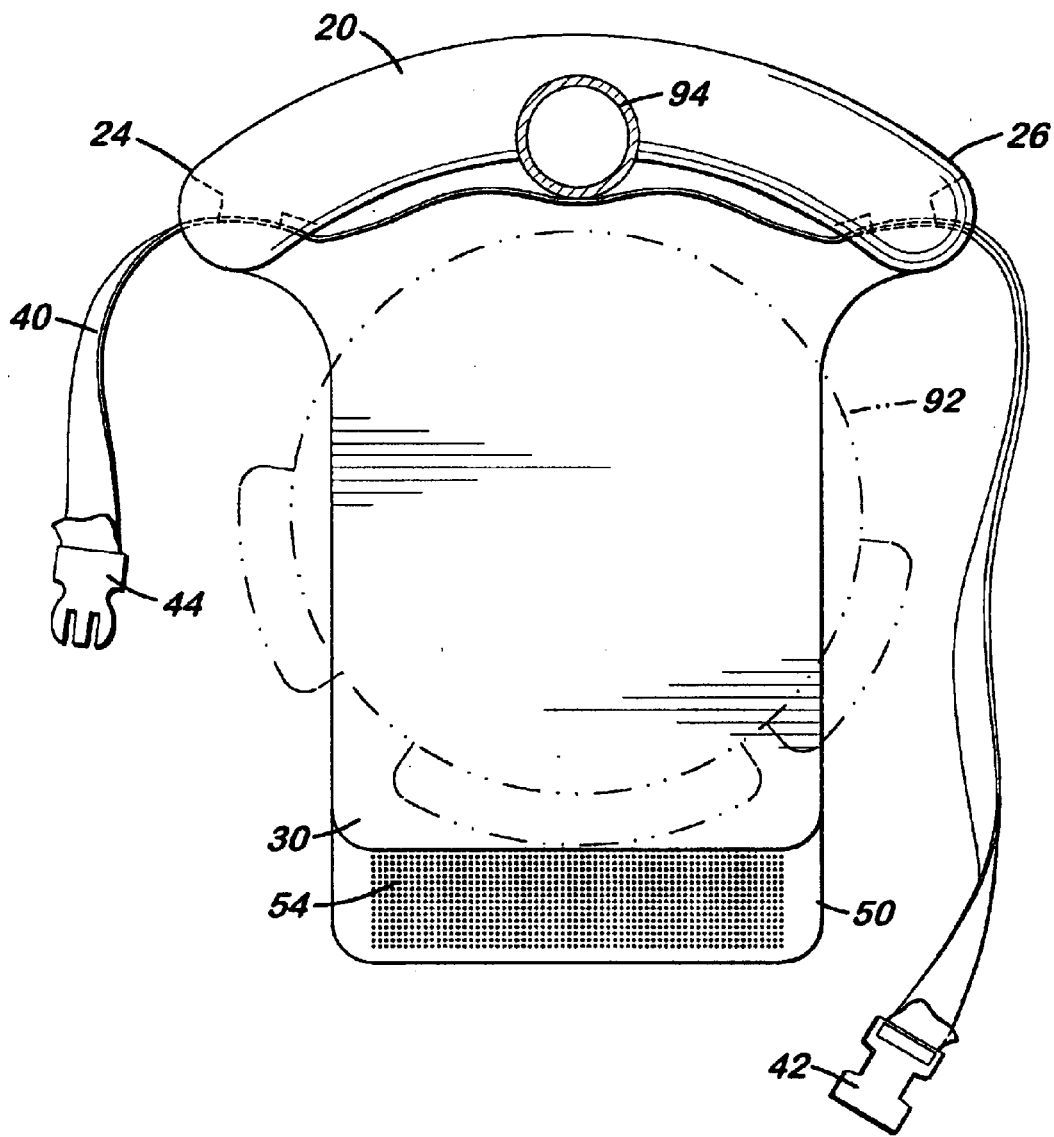
FIG. 4 is a top plan view of the invention.
Figure 5:
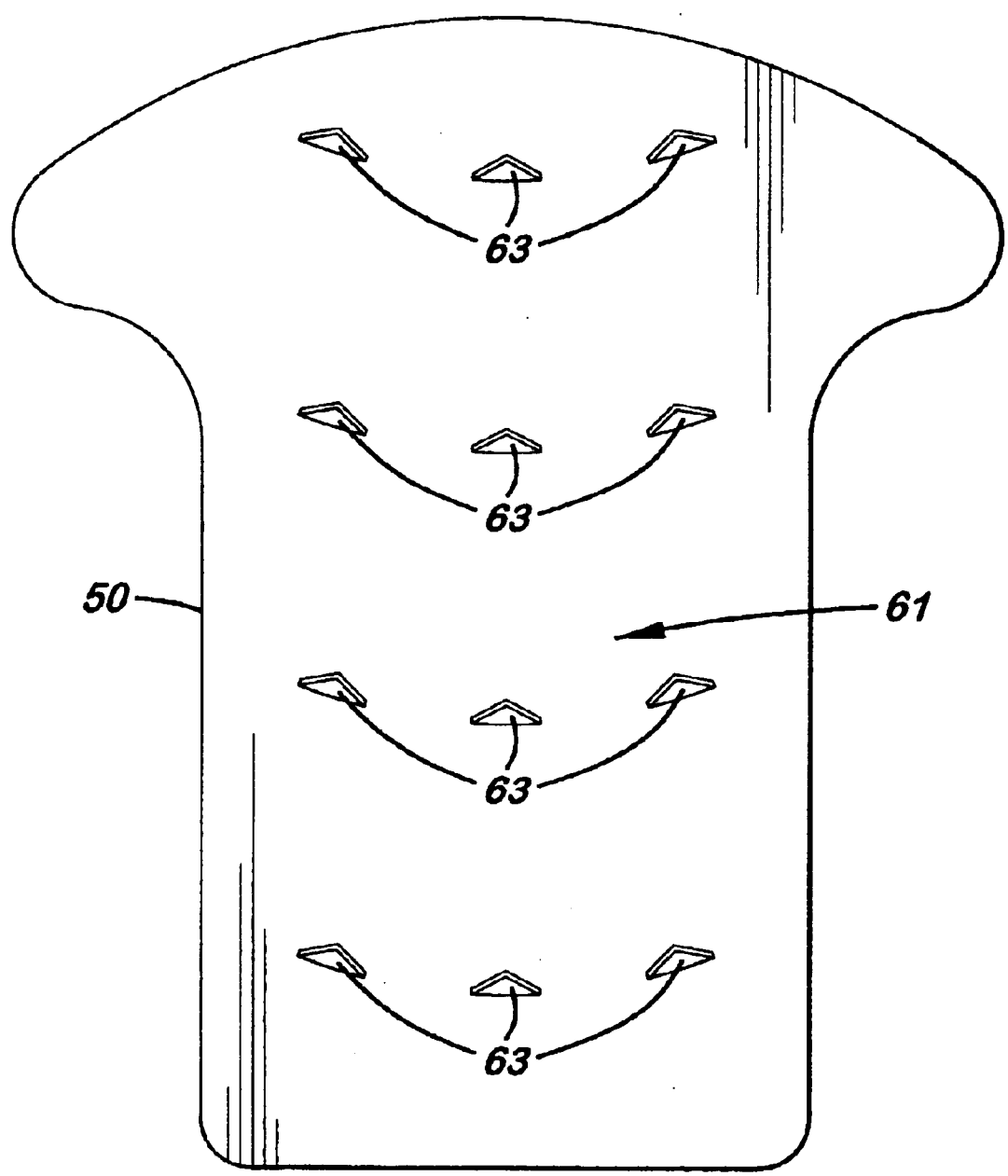
FIG. 5 is a bottom plan view of the invention.

Referring to the accompanying Figures, there is shown and described a combination golf club head cleaner and bag holder 10 that is selectively attachable to a standard manual pull golf cart 90.

The apparatus 10 includes a body member 20 with an integrally formed bag support plate 30 and a lower resting plate 50. The bag support plate 30 and resting plate 50 are spaced apart thereby forming a rearward extending opening 60 in which a golf club 80 may be placed.

The bag support plate 30 is perpendicularly aligned and extends rearward from the distal end 96 of the post member 94 on a standard manual golf cart 90 and used to support a golf bag 92. Attached to the bottom surface 31 of the bag support plate 30 is a set of downward extending bristles 34. In the preferred embodiment, the bristles 34 are randomly attached to the bottom surface 31 and are approximately 1¼ inches in length.

The resting plate 50 is slightly longer and diagonally aligned with respect to the bag support plate 30. Formed on the top surface 51 of the resting plate 50 is a set of upward extending bristles 54. Formed around the perimeter edge 52 of the resting plate 50 is an upward extending lip 53 which forms a central basin 56 on the resting plate 50 which may be filled with water 70 to enhance cleaning. The perimeter edge 52 of the resting plate 50 extends rearward from or beyond the bag support plate 30 thereby creating a section of exposed, upward extending bristles 54 that allow the sole of the golf club 80 to be easily moved back and forth between the section of bristles 34, 54 for cleaning.

Formed on the bottom surface 61 of the resting plate 50 are optional teeth 63 aligned randomly or in rows that extend downward and forward to grip the soil when the apparatus 10 is used.

Formed on the body member 20 are two laterally extending wing members 24, 26, which partially extend around the opposite sides of a golf bag 92. Formed centrally between the two wing members 24, 26 is a central bore 28 or passageway that receives the central post member 94 on a manual golf cart 90. Formed near the outer edges of the wing members 24, 26 are slots 25, 27, respectively, that receive an adjustable strap 40. Attached to the opposite ends of the strap 40 are male and female strap connectors 42, 44. The strap 40 is used to selectively hold the lower portion of the golf bag 92 on the golf cart 90.

During use, a golf bag 92 is placed on the top surface of the bag support plate 30. The ends of the strap 40 are then wrapped around the golf bag 92 and the male and female strap connectors 42, 44 are then connected together. When a golf club is dirty, the golf cart 90 is disposed in an upright position which causes the teeth 63 to imbed into the soil. The golf club 80 (putter iron, or driver) may be inserted into the opening 60 and moved side to side and back and forth therein. language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

What is claimed is:

1. A manual golf cart combination golf club head cleaner and bag holder, comprising:
   a. a manual golf cart including a central post member and a pair of wheels attached thereto;
   b. a bag support plate attached to the lower end of said post member;
   c. a lower resting plate spaced apart from and located below said bag support plate;
   d. an opening formed between said bag support plate and said resting plate, said opening being sufficient in size to receive the head of a golf club;
   e. a first set of downward extending bristles attached to said bag support plate; and,
   f. a second set of upward extending bristles attached to said resting plate.

2. The combination golf club head cleaner and bag holder as recited in claim 1, wherein said bag support plate includes at least one strap to wrap around and hold a lower end of a golf bag placed on said bag support plate.

3. The combination golf club head cleaner and bag holder as recited in claim 1, wherein said first and second set of bristles are sufficiently rigid and densely packed to remove dirt embedded on a golf club head inserted into and moved back and forth in said opening.

4. The combination golf club head cleaner and bag holder as recited in claim 3, further including a central basin formed in the resting plate.

5. The combination golf club head cleaner and bag holder as recited in claim 3, wherein said resting plate is slightly lower and diagonally aligned with respect to said bag support plate.

6. The combination golf club head cleaner and bag holder as recited in claim 5, wherein said resting plate includes a perimeter edge that extends beyond said bag support plate thereby creating a section of exposed bristles on said resting plate.

7. The combination golf club head cleaner and bag holder, as recited in claim 1, further including a ground gripping means located on said resting plate that engages the ground when said golf cart is disposed in an upright resting position on the ground.

8. An improved manual golf cart including a post member with a pair of wheels attached thereto, wherein the improvement comprises:
   a. a combination golf club head cleaner and bag support plate attached to the lower end of the post member and including a lower resting plate located below and spaced apart from said bag support plate to form a golf club opening, said bag support plate having top and bottom surfaces and said resting plate having upper and lower surfaces;
   b. a first set of downward extending bristles attached to said bottom surface of said bag support plate;
   c. a second set of upward extending bristles attached to said upper surface of said lower resting plate; and,
   d. means to hold a golf bag on said top surface of said bag support plate.

9. The improved manual gulf cart as recited in claim 8, wherein said means to hold a golf bag is at least one strap.

10. The improved manual golf cart is recited in claim 8, wherein said resting plate is slightly lower and diagonally aligned with respect to said bag support plate.

11. The improved manual golf cart as recited in claim 8, further including a ground gripping means located on said resting plate that engages the ground when said golf cart is disposed in an upright resting position on the ground.

12. The improved manual golf cart as recited in claim 11, wherein said ground gripping means is a plurality of teeth formed on said lower surface of said resting plate.

\* \* \* \* \*